United States Patent [19]

Craun et al.

[11] Patent Number: 5,104,928
[45] Date of Patent: Apr. 14, 1992

[54] THERMOSETTING COATINGS CONTAINING CARBODIIMIDES

[75] Inventors: Gary P. Craun, Berea; David L. Trumbo, Parma Hts.; Frank A. Wickert, Olmsted Township, Cuyahoga County, all of Ohio

[73] Assignee: The Glidden Company, Cleveland, Ohio

[21] Appl. No.: 464,210

[22] Filed: Jan. 12, 1990

[51] Int. Cl.$^5$ .................................... C08F 283/00
[52] U.S. Cl. .................................... 524/773; 524/824; 524/832; 524/839
[58] Field of Search ............... 524/824, 832, 773, 839

[56] References Cited

U.S. PATENT DOCUMENTS 4,644,030 2/1987 Loewrigkeit et al. .............. 524/839

*Primary Examiner*—Maurice J. Welsh
*Assistant Examiner*—Rachel Johnson
*Attorney, Agent, or Firm*—Thomas M. Schmitz

[57] ABSTRACT

Thermosetting coating compositions are based on a binder comprising carboxyl functional polyurethane, acrylic copolymer, and if desired a carbodiimide crosslinker. The binder is produced by synthesizing an isocyanate terminated, carboxyl functional urethane prepolymer in the absence of water and organic solvent but in the presence of ethylenic monomers. The organic phase urethane prepolymer dispersed in ethylenic monomers is inverted into water whereupon the urethane prepolymer is extended by reaction with a primary or secondary polyamine such as diamine to produce a high molecular weight polyurethane-urea. Thereafter, the ethylenic monomers are copolymerized to form an aqueous dispersed polyurethane-urea and acrylic copolymer mixture. The resulting polymeric binder is useful in protective surface coatings applied to plastic substrates. A carbodiimide can be added to provide thermosetting crosslinking with the carboxyl functional polyurethane.

14 Claims, No Drawings

THERMOSETTING COATINGS CONTAINING CARBODIIMIDES

This invention pertains to coating compositions and more particularly to a polyurethane/acrylic aqueous dispersion which can be adapted, if desired, to be crosslinked upon heat curing with carbodiimide crosslinkers.

BACKGROUND OF THE INVENTION

This invention pertains to protective surface coatings commonly known as paint coatings. Protective surface coatings are organic compositions applied to substrates to form continuous films which are cured or otherwise hardened to provide protection as well as a decorative appearance to the substrate. Protective surface coatings ordinarily comprise an organic polymeric binder, pigments, inert fillers and other additives. The polymeric binder functions as an organic vehicle for the pigments, inerts, and other additives in wet coating compositions and further functions as a binder for the pigments and inert fillers in the cured or hardened paint film. The polymeric binders of this invention can be thermosetting binders based on coreactive crosslinking components, if desired.

Polyurethane prepolymers for polyurethane dispersions are typically made in a solvent, such as acetone, at a low molecular weight with terminal isocyanate functionality. Acid functionality from compounds like dimethylol propionic acid renders these urethane prepolymers water dispersible after the addition of a tertiary amine. Some amount of an inverting solvent such as butyl cellosolve ordinarily is included. Once dispersed in water, a diamine (hexamethylene diamine) can be added to convert the remaining isocyanate groups to urea linkages and thus form a high molecular weight polyurethane urea. Solvent can then be removed by distillation. A disadvantage of this procedure is the use of organic solvent in producing the polyurethane prepolymer where the solvent has to be either removed by distillation or left in the polyurethane dispersion. Solvent not removed is retained in the finished paint which is detrimental to the cured coating film properties. Waterborne polyurethanes are disclosed in the *Journal of Coated Fabrics*. Vol. 16, pgs. 39-79 (Jul., 1986). Prior art patents disclosing water-dispersed polyurethanes include U.S. Pat. Nos. 4,335,029; 3,826,769; 4,305,858; 4,306,998; 4,147,680; 4,211,683; and 4,408,008.

Blends of a polyurethane with an acrylic polymer have a better balance of properties than either of the two polymers individually when evaluated alone. The polyurethane dispersion can be prepared as above, whereupon some or all of the organic solvent is removed by distillation, followed by the acrylic monomer and initiator being added to the preformed dispersion. The ethylenic monomers dissolve in the polyurethane particles, polymerize, and form a polymeric blend. However, this procedure still utilizes organic solvent in the preparation of polyurethane and some solvent can be retained in the composition.

It now has been found that aqueous dispersions of polyurethane/acrylic polymers can be prepared without organic solvent and, if desired, can be crosslinked at ambient or low bake temperatures with carbodiimide crosslinkers. Such compositions are particularly suitable for application and adhesion to temperature sensitive plastic substrates, where the cured paint films, particularly crosslinked films, exhibit excellent flexibility, adhesion, and water resistance when applied to several types of plastic substrates. Carboxyl functional latex resins crosslinked by polycarbodiimides are disclosed in European Patent Application Publication No. 0,121,083 published Oct. 10, 1984 based on Application No. 84101921.9 filed Feb. 23, 1984.

In accordance with this invention, a process has been discovered to prepare polyurethane/acrylic dispersions which does not require solvent during the synthesis of the urethane prepolymer. Materials for making the urethane prepolymer (diisocyanate, diol, dimethylolpropionic acid, catalyst, and optionally hydroxyl functional UV stabilizers, etc.) are first dissolved in ethylenically unsaturated monomers which serve as a solvent for synthesizing a low molecular weight urethane prepolymer as well as reducing the viscosity of the prepolymer to a processable level. Tertiary amine is added to invert this organic phase into a water dispersed organic phase of urethane prepolymer. Thereafter, the prepolymer is coreacted with primary or secondary amine to extend the isocyanate functional prepolymer into a high molecular weight polyurethane urea containing the monomers and dispersed in water. Thereafter the ethylenic monomers are copolymerized to provide a polyurethane-urea and acrylic copolymer dispersion in water. An improved product results and the process advantageously avoids the use and subsequent removal of organic solvent. The in-situ formed polymeric mixture of polyurethane-urea and acrylic copolymer stably dispersed in water can be used to provide a coalescent cured film or alternatively coreacted with a carbodiimide to provide a crosslinked cured film. These and other advantages of this invention will become more apparent by referring to the detailed description and illustrative examples.

SUMMARY OF THE INVENTION

Briefly, the invention pertains to thermosetting coating compositions based on a water-dispersed, polymeric binder comprising polyurethane-urea and acrylic copolymers adapted to cure by coalescence or to coreact with carbodiimide crosslinkers upon ambient or heat curing of the surface coating. The binder is produced in a solvent-free process by dissolving the polyurethane raw materials into monomer, reacting the raw materials to form a low molecular weight urethane prepolymer, inverting the prepolymer into water, extending the prepolymer to form a high molecular weight polyurethane-urea, and copolymerizing the monomers to produce an in-situ formed polyurethane-urea and acrylic copolymer in an aqueous dispersion. Dicarbodiimide crosslinker can be added, if desired, to make the aqueous dispersion a heat activated crosslinkable coating.

DETAILED DESCRIPTION OF THE INVENTION

The protective coating composition comprises a polymeric binder comprising a carboxyl functional polyurethane-urea and acrylic copolymer mixture adapted to be crosslinked by carbodiimide crosslinkers.

Carboxyl functional polyurethane-urea polymers contain carbamate (urethane) groups in the polymer backbone as well as urea functionality along with terminal or pendant carboxyl groups. Polyurethanes are formed conventionally by coreaction of a diisocyanate with a hydroxyl-functional oligomer such as a polyester or polyether or polyalkyl oxide, whereupon the urethane product can be further reacted with a short-chain glycol extender if desired. In accordance with this invention, excess equivalents of diisocyanate are reacted with lesser equivalents of hydroxyl functional oligomer, glycol, glycol acid or other carboxyl compound reactant, and optionally hydroxyl functional UV stabilizer compounds to produce a carboxyl terminated or pendant isocyanate functional urethane prepolymer. Suitable diisocyanates include toluene diisocyanate isomers (TDI), polymeric isocyanate (PMDI), 4,4'-methylenebis (phenyl isocyanate) or (MDI), isophorone diisocyanate (IPDI), hexamethylene diisocyanate, trimethylhexamethylene diisocyanate (TMDI), methylenebis (cyclohexyl isocyanate) and similar aromatic or aliphatic diisocyanates, as well as minor amounts of trifunctional isocyanates such as trimerized isophorone isocyanate or biuret of hexamethylene diisocyanate, if desired. Useful commercial polyether polyols include polyethylene glycol, polypropylene glycol, polytetramethylene glycol, and various polyol adducts of propylene or ethylene oxide. Useful polyester polyols are low molecular weight linear or branched polymers or oligomers comprising reaction products of excess equivalents of glycol with lesser equivalents of dicarboxyl aliphatic or aromatic acid. Typical polyesters include ethylene, propylene, or butane glycol reacted with adipic acid or similar aliphatic dicarboxylic acid. Useful extender glycols, if desired, include ethylene glycol, diethylene glycol, triethylene glycol, propylene glycol, dipropylene glycol, neopentyl glycol, butylene glycols, and similar lower aliphatic glycols and diols. Lesser amounts of polyols ca be added to provide branching, such as trimethylol propane, pentaerythritol and the like. Carboxyl functional compounds containing reactive groups are further included as reactants to form the urethane prepolymer. Carboxyl functional compounds contain functionally reactive groups, such as hydroxy or amine groups, which are primary functional groups adapted to react with isocyanate in preference to the carboxyl group. Carboxyl functional coreactants having reactive groups adapted to coreact with excess unreacted isocyanate groups on the prepolymer include hydroxyl or amine functional carboxyl compounds such as dimethylol propionic acid, lactic acid, 12-hydroxy stearic acid, glycine, and various other hydroxyl and amino acids. If a UV stabilizer is desired, a hydroxyl functional UV stabilizer can be coreacted to provide bound UV stability to the polyurethane. The resulting urethane prepolymer is a carboxyl functional, isocyanate terminated urethane having a number average molecular weight between about 500 and 5,000 as measured by GPC. The Acid No. of the urethane prepolymer should be at least about 15 and preferably between about 20 and 100.

In accordance with this invention, the carboxyl functional polyurethane is produced by first dissolving the hydroxyl oligomer, diisocyanate, extender glycol, carboxyl functional compound and UV stabilizer, if desired, into ethylenically unsaturated monomers but in the absence of organic solvents. The foregoing components preferably are reacted simultaneously to form the low molecular weight isocyanate terminated urethane prepolymer. Alternatively, an isocyanate functional prepolymer can be produced by using a step-wise addition of the above components. The urethane reaction can be catalyzed with a catalyst such as dibutyl tin laurate at temperature between about 20° C. and 150° C. but preferably around 50° C. to 70° C. The weight ratio of urethane reactants to ethylenic monomers can be between about 1:5 to 5:1 of reactants to monomers. To avoid free radical polymerization of the monomers, the urethane prepolymer formation can be kept under an air purge. If desired, low levels of free radical inhibitors such as hydroquinone can also be used to prevent premature free radical polymerization of the monomers. The resulting composition comprises a carboxyl functional, low molecular weight, isocyanate terminated urethane prepolymer dispersed in ethylenically unsaturated monomers.

In order to invert the urethane prepolymer into water, tertiary amines such as dimethylethanol amine can be added to the finished urethane prepolymer at about room temperature. Equivalent ratios of tertiary amine to acid functionality in the urethane prepolymer dispersion can be about 0.5:1 to 1.5:1. Tertiary amine will not react with the isocyanate. Free radical initiator can be added at this stage or after inversion into water. Suitable initiators include the common peroxides, peresters, hydroperoxides, azo initiators and the like, but preferred initiators are those most stable with tertiary amines such as the azo compounds. A small amount of an inverting solvent such as butyl cellosolve can be added, if desired, before inversion at a 0 to 10% by weight level. Inversion into water is accomplished by adding water to the amine neutralized urethane prepolymer solution to give a solids level of about 10 to 60% by weight of urethane prepolymer plus monomers dispersed in water.

The inversion step is preferably done at about room temperature to reduce isocyanate hydrolysis. Soon after inversion, a polyamine, such as a diprimary or disecondary amine is added to extend the urethane prepolymer. Tertiary amine which is present as an inverting aid does not react with isocyanate. Primary or secondary amines react with isocyanate to form urea links, and thus the isocyanate functional urethane prepolymer is extended to form a high molecular weight polyurethane-urea in the dispersed phase where the polyurethane-urea has a number average molecular weight above 10,000 and typically above 50,000. Primary polyamines are most reactive and hence are preferred. Amines such as 1,6-hexane diamine, cyclohexyl diamine, and the like can be used at a level which gives about 1:1 amine to isocyanate on an equivalent ratio basis. The amine-isocyanate reaction is rapid at low temperatures, if primary diamines are used, and hence, primary amines should be added slowly or preferably diluted in water. Some of this amine addition can be omitted, if desired, because a portion of the isocyanate will hydrolyze to form amine and carbon dioxide, and the resulting amine will react with isocyanate to similarly form polyurethane-urea product. Once inverted, the temperature can be raised under nitrogen to about 40° to 90° C. (depending on the type of initiator used), and the reaction temperature is maintained until the ethylenic monomers are copolymerized to a desired level. Additional monomer can be added after the polymerization reaction is partially completed to produce a higher acrylic to polyurethane-urea weight ratio.

Referring now to the ethylenically unsaturated monomers used as a solvent during the polyurethane prepolymer formation and thereafter copolymerized in accordance with this invention, useful ethylenic monomers include unsaturated monomers containing carbon-to-carbon unsaturation such as vinyl monomers, acrylic monomers, allylic monomers, acrylamide monomers, and mono- and dicarboxylic unsaturated acids. In accordance with this invention, the ethylenic monomers comprise on a weight basis between about 1% and 100% of an acrylic monomer, between 0% and 30% carboxyl functional monomer, with the balance being other ethylenically unsaturated monomers. Preferred monomeric compositions comprise between 30% and 100% acrylic monomer, between 0% and 20% carboxyl monomer such as an acrylic acid, with the balance being other ethylenic monomers. Most preferred acrylic copolymers comprise between 40% and 90% acrylic monomer, between 1% and 20% carboxyl functional monomer, with the balance being other ethylenic monomers.

Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. Carboxyl functional monomers comprise acrylic acids including acrylic and methacrylic acid, ethacrylic acid, alpha-chloroacrylic acid, alpha-cyanoacrylic acid, crotonic acid, beta-acryloxy propionic acid, and beta-styryl acrylic acid. Other ethylenic monomers include vinyl esters which include vinyl acetate, vinyl propionate, vinyl butyrates, vinyl benzoates, vinyl isopropyl acetates and similar vinyl esters; vinyl halides which include vinyl chloride, vinyl fluoride, and vinylidene chloride; vinyl aromatic hydrocarbons include styrene, methyl styrenes and similar lower alkyl styrenes, chlorostyrene, vinyl toluene, vinyl naphthalene, and divinyl benzene; vinyl aliphatic hydrocarbon monomers include alpha olefins such as ethylene, propylene, isobutylene, and cyclohexyl as well as conjugated dienes such as 1,3-butadiene, methyl-2-butadiene, 1,3-piperylene, 2,3-dimethyl butadiene, isoprene, cyclohexane, cyclopentadiene, and dicyclopentadiene; vinyl alkyl ethers include methyl vinyl ether, isopropyl vinyl ether, n-butyl vinyl ether, and isobutyl vinyl ether; and acrylamide monomers which include acrylamides or methacrylamides as well as N-methylol acrylamide, N-ethanol acrylamide, N-propanol acrylamide, N-methylol methacrylamide, N-ethanol methacrylamide, and similar alkyl acrylamide or methacrylamide monomers containing methyl, ethyl, propyl, n-butyl or isobutyl alkyl groups.

The weight ratio of ethylenic monomers to polyurethane components comprises on a weight basis between about 10% to 90% monomer and 10% to 90% polyurethane components. As noted above, the low molecular weight urethane prepolymer is produced by coreacting the reactants in the absence of organic solvent and water but dissolved in the monomers. After inversion into the water phase and subsequent extension to produce the high molecular weight polyurethane-urea, the monomers can be copolymerized to produce an in-situ formed acrylic copolymer and a polymeric mixture containing between about 10% to 90% carboxyl functional polyurethane-urea and between about 10% to 90% acrylic copolymer. After some portion of the monomers have been polymerized, additional monomer can be added, preferably over a period of about 0.5 to 3.0 hours. Carboxyl functional monomer is preferably added at this stage. The resulting polymer mixture will again contain between about 10–90% polyurethane and 10–90% acrylic copolymer. The unsaturated monomers are copolymerized in the aqueous polymerization medium containing the dispersed polyurethane-urea polymer which acts as a stabilizing polymer for the acrylic monomers. No surfactants are required. Initiators which can be added before inversion include for example, typical free radical and redox types such as hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, dimethylazobis-isobutyrate, ammonium persulfate, sodium persulfate, potassium persulfate, sodium perphosphate, potassium perphosphate, isopropyl peroxycarbonate, and redox initiators such as sodium persulfate-sodium formaldehyde sulfoxylate, cumene hydroperoxide-sodium metabisulfite, potassium persulfate-sodium bisulfite, cumene hydroperoxide-iron (II) sulfate, etc. The polymerization initiators are usually added in amounts between about 0.1 to 2 weight percent based on the monomer additions.

Referring next to the carbodiimide crosslinkers, carbodiimides generally comprise aliphatic or aromatic dinitrogen analogue of carbonic acid of the generalized structure:

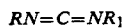

$$RN=C=NR_1$$

where R and $R_1$ individually can be hydrogen, aliphatic or aromatic groups. Aliphatic groups comprise alkyl chains containing between 1 and 20 carbon atoms, and can include for example a dicarbodiimide such as dicyclohexyl carbodiimide. Useful commercially available carbodiimides further include for instance Union Carbide's polymeric carbodiimides, U Carlink XL-255E and XL-20. Advanced, oligomeric, or polymeric carbodiimides are desirable, as they have lower toxicity.

Emulsified or water soluble polyfunctional carbodiimides can comprise the reaction product of mono, -di, or tri- cycloaliphatic or saturated aliphatic isocyanate where diisocyanates are preferred. The cycloaliphatic structure can contain 5 to 7 carbons and can be substituted with alkyl groups having 1 to 6 carbons and oxygen while the saturated aliphatic structures can contain 1 to about 18 carbons. A detailed description of the preparation of polycarbodiimides is set forth in European Patent Application publication No. 0 121 083 published Oct. 10, 1984 further identified as application no. 84101921.9 filed Feb. 23, 1984, and the same is incorporated herein by reference. The polycarbodiimide can be dispersed into water by using a surfactant such as sodium dialkyl sulfosuccinate. Solvent borne carbodiimides, such as U Carlink XL255E and XL-20 can be simply added to a polyurethane-acrylic dispersion with stirring. Alternatively, a water soluble polycarbodiimide can be prepared by reacting minor amounts of an amine such as dimethyl aminopropylamine and an alkyl sulfonate or sulfate into the carbodiimide structure as proposed in said EP publication No. 0 121 083.

On a weight basis, the polymeric binder composition of this invention comprises between about 0 and 30 weight parts carbodiimide crosslinker for 100 weight parts of in-situ formed acrylic copolymer of copolymerized monomer and high molecular weight polyurethane-urea. On a weight percentage basis, the polymeric binder composition comprises between 0% and 30% carbodiimide crosslinker, between 9% and 90% acrylic copolymer of copolymerized monomers, and between 9% and 90% high molecular weight polyurethane-urea. The preferred thermosetting composition contains at least 1% carbodiimide crosslinker. The carbodiimide crosslinker is typically blended into the polyurethane-acrylic dispersion just prior to use.

In another aspect of this invention, a ultraviolet (UV) resistant coating can be produced where the polyurethane polymer prepared in accordance with this invention contains a hindered amine light stabilizer attached to the polyurethane-urea polymer structure. The polyurethane-urea polymer containing the UV component is prepared in liquid monomers which are subsequently copolymerized in-situ as previously described. A simple, low-cost, high performance UV screening primer or tie coat can be produced by adding functionally reactive UV stabilizers, such as hindered amine phenol compounds where the functional group coreacts with other components to form the polyurethane polymer. The hindered amines or other UV stabilizer can be simply incorporated into these dispersions by adding the compounds with diols and other hydroxyl functional materials during the urethane prepolymer or polyurethane-urea synthesis step of producing the polyurethane-urea and acrylic copolymer dispersion, whereby UV stabilizers containing hydroxyl groups will be tied into the urethane backbone. Coatings containing bound UV stabilizers provide better UV protection than additive free UV stabilizers and such coatings are particularly suitable for plastic substrates. The bound UV stabilizers will not migrate into the plastic substrate or out of the coating film.

Hydroxyl functional UV stabilizers can be copolymerized with other raw materials for producing the urethane prepolymer in the low molecular weight urethane synthesis step. Between about 0.1% and 5% by weight of hydroxyl functional UV stabilizer, such as phenol, can be coreacted with diisocyanate along with hydroxy oligomer, carboxyl compound reactant, and glycol extender as previously described. Useful UV stabilizers include for example phenol functional adapted to coreact with the polyurethane reactants to incorporate the UV component into the polyurethane polymer backbone. Useful UV compounds include phenol functional amidines (cyclic hindered amines), benzophenones, acetophenones, benzathrones, alkylphenones, and benzaldehydes as more particularly set forth in U.S. Pat. No. 4,129,488 and incorporated herein by reference.

The merits of this invention are further illustrated by the following examples.

EXAMPLE 1

A polyurethane-urea was prepared as follows:

| (a) | polytetramethylene oxide (1000 Mn) | 100 g |
| | dimethylolpropionic acid, micronized | 26.8 g |
| | isophoronediisocyanate | 88.9 g |
| | dibutyl tin dilaurate | 0.1 g |
| | styrene | 21.6 g |
| | methylmethacrylate | 133 g |
| | butyl acrylate | 61.3 g |
| (b) | dimethylethanol amine | 17.8 |
| | Lupersol 11 (Lucidol) | 4.5 g |
| | butyl cellosolve | 22.7 g |

| (c) | water | 681 g |
| (d) | 1,6-hexamethylene diamine | 11.6 g |

Mix all ingredients in (a) together, place in a flask with a stirrer under an air purge at 60° C., and mix for about 24 hours until all the dimethylol propionic acid (DMPA) is coreacted to form the urethane prepolymer. If the DMPA is ground to a fine solid, the reaction time is shorter. Add the ingredients in (b) separately to the reactor after the contents have been cooled to about 30° C. Add the water slowly over about 30 minutes, saving about 20 g to dilute the diamine. Add the diluted diamine over about 15 minutes to form the polyurethane-urea polymer. Warm under a nitrogen purge to about 60° C. and hold for about 2 hours, heat to 70° C. to copolymerize the monomers and hold about 2 hours, and then cool. The viscosity of the inverted system will rapidly drop during the polymerization.

The water-dispersed polyurethane-urea and acrylic copolymer can be used as a polymeric binder for clear or pigmented protective films. The applied films can be coalesced at room temperature or with mild heat to flash the water and provide an excellent cured film.

For a thermosetting coating, a test sample of 1.6 g of dicarbodiimide (XL-25SE Union Carbide) was added to 20 g of the finished polyurethane urea and acrylic copolymer product with stirring. A film was drawn down on Bonderite 1000 cold rolled steel panels and baked at 140° F. for 20 minutes. Physical properties of the cured film were as follows:

gloss = 83% at 60 degrees
impact = 160 in. lb. forward and reverse
pencil hardness = F

EXAMPLE 2

Prepare a polyurethane-urea with the following:

| (a) | 2(2'-hydroxy-5'-methylphenyl) benzotriazole* | 10 g |
| | dimethylolpropionic acid, micronized | 26.8 g |
| | isophoronediisocyanate | 93.9 g |
| | dibutyl tin dilaurate | 0.1 g |
| | styrene | 21.6 g |
| | methylmethacrylate | 133 g |
| | butyl acrylate | 61.3 g |
| (b) | dimethylethanol amine | 17.8 g |
| | Lupersol 11 (Licidol) | 4.5 g |
| | butyl cellosolve | 22.7 g |
| (c) | water | 681 g |
| (d) | 1,6-hexanediamine | 11.6 g |

*Tinuvin P, Ciba-Geigy

Following the procedure in Example 1, the polyurethane-urea product was prepared and then mixed with a carbodiimide crosslinker, and cured at 140° F. The UV component incorporated into the polyurethane polymer is Tinuvin P, Ciba-Geigy. The resulting polymeric mixture provided an excellent UV resistant cured protective film applied to a plastic substrate.

The invention has been described and illustrated by examples but is not intended to be limited except by the appended claims.

We claim:

1. An aqueous dispersed, protective coating composition containing a thermosetting polymer binder comprising on a weight basis between about 9% and 90% of a carboxyl functional polyurethane-urea having a number average weight above about 10,000 between about 9% and 90% of an acrylic copolymer of copolymerized ethylenically unsaturated monomers, and between about 1% and 30% carbodiimide crosslinker, where the polymeric binder is produced by:

synthesizing a low molecular weight, isocyanate terminated urethane prepolymer having carboxyl functionality in the presence of said monomers, but in the absence of water and organic solvent, to form an organic phase consisting of a monomer dispersed urethane prepolymer having a number average molecular weight less than about 6000; inverting said organic phase into water to form an aqueous phase containing said organic phase of monomer dispersed urethane prepolymer; advancing the molecular weight of said urethane prepolymer to form a high molecular weight, carboxyl functional polyurethane-urea dispersion containing said monomers; copolymerizing the ethylenically unsaturated monomers to form an acrylic copolymer and produce an aqueous dispersion of carboxyl functional polyurethane-urea and acrylic copolymer mixture.

2. The coating composition of claim 1 where the acrylic copolymer comprises between 30% and 100% acrylic monomer, between 0% and 20% of an acrylic acid, with the balance being other ethylenic monomers.

3. The coating composition of claim 1 where the acrylic copolymer comprises by weight copolymerized monomers between 40% and 90% acrylic monomer, between 1% and 20% carboxyl functional monomer, with the balance being other ethylenically unsaturated monomers.

4. The coating composition of claim 1 where the urethane prepolymer has a number average molecular weight between about 500 and 5,000.

5. The coating composition of claim 1 where the inverting of the organic phase into water is achieved by the addition of a tertiary amine to the low molecular weight urethane prepolymer.

6. The coating composition of claim 1 where the isocyanate urethane prepolymer comprises the coreaction of polyol carboxyl functional compound with excess equivalents of diisocyanate.

7. The coating composition of claim 1 where the isocyanate terminated urethane prepolymer comprises the coreaction of lesser equivalents of polyol, carboxyl functional compound having reactive amine or hydroxyl groups, and extender glycol with excess equivalents of diisocyanate.

8. The coating composition of claim 1 where the urethane prepolymer is extended by coreaction with a primary or secondary diamine to form the high molecular weight polyurethane-urea.

9. The coating composition of claim 8 where the diamine is a primary amine.

10. The coating composition of claim 1 where the isocyanate terminated urethane prepolymer is extended by a hydroxyl functional compound.

11. The coating composition of claim 10 where the hydroxyl functional compound contains carboxyl groups which are substantially non-reactive with isocyanate groups on the isocyanate terminated urethane prepolymer.

12. The coating composition of claim 6 where the synthesis of the isocyanate terminated urethane prepolymer includes the coreaction of a hydroxyl functional UV stabilizer with diisocyanate.

13. The coating composition of claim 6 where the polyurethane-urea polymer has a number average molecular weight above about 10,000.

14. An aqueous dispersed, protective coating containing a polymer binder, the binder comprising on a weight basis;

between 9% and 90% of a carboxyl functional polyurethane-urea having a number average molecular weight above about 10,000;

between about 9% and 90% of an acrylic copolymer of copolymerized ethylenically unsaturated monomers comprising by weight between 1% and 100% acrylic monomer, between 0% and 30% carboxyl functional monomer, with the balance being other ethylenically unsaturated monomer; and between 1% and 30% carbodiimide crosslinker;

where said polyurethane and said acrylic copolymer are produced by synthesizing a low molecular weight, isocyanate terminated urethane prepolymer having carboxyl functionality in the presence of said monomers, but in the absence of water and organic solvent, to form an organic phase consisting of a monomer dispersed urethane prepolymer having a number average molecular weight less than about 6000; inverting said organic phase into water to form an aqueous phase containing said organic phase of monomer dispersed urethane prepolymer; advancing the molecular weight of said urethane prepolymer to form a high molecular weight, carboxyl functional polyurethane-urea dispersion containing said monomers; copolymerizing the ethylenically unsaturated monomers to form an acrylic copolymer and produce an aqueous dispersion of carboxyl functional polyurethane-urea and acrylic copolymer mixture.

* * * * *